US010274299B2

(12) United States Patent
Falchieri

(10) Patent No.: US 10,274,299 B2
(45) Date of Patent: Apr. 30, 2019

(54) APPARATUS FOR INSPECTING MACHINED BORES

(71) Applicant: Marposs Corporation, Auburn Hills, MI (US)

(72) Inventor: Giordano Falchieri, Bloomfield Hills, MI (US)

(73) Assignee: Marposs Corporation, Auburn Hills, MI (US)

( * ) Notice: Subject to any disclaimer, the term of this patent is extended or adjusted under 35 U.S.C. 154(b) by 261 days.

(21) Appl. No.: 15/271,443

(22) Filed: Sep. 21, 2016

(65) Prior Publication Data

US 2017/0010084 A1 Jan. 12, 2017

Related U.S. Application Data

(63) Continuation of application No. PCT/US2014/054222, filed on Sep. 5, 2014.

(60) Provisional application No. 61/969,492, filed on Mar. 24, 2014.

(51) Int. Cl.
*G01B 5/12* (2006.01)
*G01B 7/13* (2006.01)
*G01B 5/00* (2006.01)

(52) U.S. Cl.
CPC .............. *G01B 5/12* (2013.01); *G01B 5/003* (2013.01); *G01B 5/0014* (2013.01); *G01B 7/13* (2013.01)

(58) Field of Classification Search
CPC ...... G01B 5/0014; G01B 5/003; G01B 5/008; G01B 5/12; G01B 7/13
USPC .......................................... 33/503, 504, 542
See application file for complete search history.

(56) References Cited

U.S. PATENT DOCUMENTS

| 2,659,157 | A | * | 11/1953 | Aller | ....................... | B07B 13/04 |
| | | | | | | 29/33 R |
| 4,412,385 | A | * | 11/1983 | Selleri | ...................... | G01B 7/13 |
| | | | | | | 33/520 |
| 4,588,880 | A | * | 5/1986 | Hesser | ...................... | B07C 5/34 |
| | | | | | | 235/376 |
| 4,635,056 | A | | 1/1987 | Merle et al. | | |

(Continued)

FOREIGN PATENT DOCUMENTS

| EP | 2188586 B1 | * | 5/2014 | ............ B25J 9/1682 |
| WO | WO 0034974 A1 | * | 6/2000 | ........... G01B 5/0014 |

OTHER PUBLICATIONS

International Search Report and Written Opinion dated Dec. 23, 2014, Form PCT/ISA/220, 12 pages.

*Primary Examiner* — R. A. Smith
(74) *Attorney, Agent, or Firm* — Gunther J. Evanina; Butzel Long, P.C.

(57) ABSTRACT

A gauging machine for inspecting bore diameters of a workpiece includes a reference fixture, a first wide range bore gauge arranged on a first three-dimensional positioning apparatus to facilitate inspection of a first set of bores aligned along parallel axes, and a second wide range bore gauge arranged on a second three-dimensional positioning apparatus to facilitate inspection of one bore or a plurality of bores aligned along parallel axes. The gauging machine facilitates inspection of bores on a plurality of different workpieces having different overall dimensions, a different number of bores, different positioning of bores, and/or different size bores, without requiring retooling of the gauging machine.

18 Claims, 4 Drawing Sheets

(56) References Cited

U.S. PATENT DOCUMENTS

| | | | | |
|---|---|---|---|---|
| 4,682,418 | A | * | 7/1987 | Tuss et al. ............ G01B 7/008 |
| | | | | 33/1 M |
| 4,872,269 | A | * | 10/1989 | Sattmann ................ G01B 7/13 |
| | | | | 33/552 |
| 4,895,454 | A | * | 1/1990 | Kammleiter et al. . B23Q 41/00 |
| | | | | 33/702 |
| 4,953,306 | A | * | 9/1990 | Weckenmann et al. ..................... |
| | | | | G01B 5/008 |
| | | | | 33/1 M |
| 4,986,004 | A | * | 1/1991 | Hartmann et al. ...... G01B 5/207 |
| | | | | 33/544.2 |
| 5,009,512 | A | * | 4/1991 | Lessi et al. ............. G01B 7/16 |
| | | | | 33/557 |
| 5,259,119 | A | | 11/1993 | Yoshioka et al. |
| 5,325,177 | A | | 6/1994 | Peterson |
| RE37,695 | E | * | 5/2002 | Leitenberger et al. ..................... |
| | | | | G01B 5/004 |
| | | | | 33/503 |
| 6,616,034 | B2 | * | 9/2003 | Wu et al. ............ G06Q 20/346 |
| | | | | 235/375 |
| 7,316,075 | B2 | * | 1/2008 | Seitz et al. ............. G01B 5/008 |
| | | | | 33/503 |
| 8,545,145 | B2 | * | 10/2013 | Mizuta et al. ......... B23Q 1/012 |
| | | | | 33/503 |
| 2007/0093689 | A1 | | 4/2007 | Steinberg |
| 2010/0049055 | A1 | | 2/2010 | Freudenberg et al. |
| 2010/0101105 | A1 | * | 4/2010 | Hon et al. ............. B23Q 17/20 |
| | | | | 33/503 |
| 2010/0286812 | A1 | * | 11/2010 | Slettemoen et al. ... B23Q 17/09 |
| | | | | 700/160 |

* cited by examiner

APPARATUS FOR INSPECTING MACHINED BORES

CROSS-REFERENCE TO RELATED APPLICATIONS

This application is a continuation of PCT Application No. PCT/US2014/054222, filed Sep. 5, 2014, claiming priority to Provisional Application No. 61/969,492, filed Mar. 24, 2014, which are incorporated herein by reference in their entirety.

FIELD OF THE DISCLOSURE

This disclosure relates to gauging bore diameters in mechanical parts, and more particularly to systems that facilitate gauging of bores in a mechanical part mounted on a reference fixture in which at least one of the bores is aligned along an axis that is not parallel with the axis along which another bore is aligned, or at least one of the bores is on a side of the workpiece opposite the side on which another bore is located.

BACKGROUND OF THE DISCLOSURE

Certain known apparatuses for measuring the dimension of cylindrical bores of a workpiece such as an engine block employ a plurality of gauges that can be displaced axially and transversely. However, such apparatuses do not facilitate movement of the gauges laterally with respect to each other, such as to accommodate bore measurements of different workpieces having bores that are positioned differently with respect to each other. Such apparatuses also do not allow inspection and measurement of bores that are aligned along axes that are not parallel to each other.

SUMMARY OF THE DISCLOSURE

The systems for gauging bore diameters that are disclosed herein generally include a reference fixture onto which a workpiece can be mounted; a first bore gauge arranged to inspect or measure one or more bores in a workpiece that are aligned along a first set of parallel axes and which are mounted on a first three-dimensional positioning apparatus; and a second bore gauge arranged to inspect or measure one or more bores aligned along a second set of parallel axes and which are mounted on a second three-dimensional positioning apparatus. The reference fixture, first three-dimensional positioning apparatus and second three-dimensional positioning apparatus are arranged to facilitate inspection of the bores of a workpiece that is mounted on the reference fixture.

The bores of the workpiece are generally cylindrical in shape and the bore gauges are cylinder bore gauges.

In accordance with certain aspects of this disclosure, the workpiece is an engine block, the one or more bores aligned along a first set of parallel axes are one or more cylinders for receiving a reciprocating piston, and the one or more bores aligned along a second set of parallel axes includes a crank bore configured for receiving a crank shaft. The first cylinder bore gauge is used for measuring or inspecting the cylinder bores of the engine block and the second cylinder bore gauge is a crank bore gauge for measuring or inspecting the crank bore of the engine block.

In certain aspects of the disclosure, the workpiece is an engine block having a first set of cylinder bores having parallel axes and a second set of cylinder bores having parallel axes that are not parallel with the axes of the first set of cylinder bores, wherein the first bore gauge is a cylinder bore gauge for measuring or inspecting the first set of bores, and the second bore gauge is a cylinder bore gauge for measuring or inspecting the second set of bores.

The reference fixture can be configured to facilitate mounting of a workpiece directly to the reference fixture. Alternatively, the reference fixture can be configured to facilitate mounting of an adapter onto which the workpiece is mounted. As still another alternative, the reference fixture can be configured to facilitate mounting of certain kinds of workpieces directly to the reference fixture, and mounting of certain other kinds of workpieces to an adapter that is mounted to the reference fixture. The adapter can help facilitate measuring or inspection of bores in different types of workpieces that have different dimensions, different spacing between bores, different number of bores, and/or different size bores without requiring retooling or other substantial modifications to the bore inspection apparatus. The reference fixture may include means to verify the correct location of the workpiece such as air checks or other gauging means.

The crank and cylinder bore gauges may have wide range capability to check bores of different sizes without retooling or adjustments. They are based on wide range transducers able to cover several millimeters of range. They may also include a retraction device lifting the contact before entering the bore to avoid mechanical interference with the bore edge. The retraction may be pneumatically actuated or by other means like electric, hydraulic or others.

In certain aspects of the disclosure, the apparatus is provided with a surface cleaner for removing particles, debris or other residue that is left on the surface of the bores after machining and which could otherwise interfere with a gauging or inspection process being performed using the disclosed apparatus. For example, a surface cleaner could comprise an air blower or nozzle for directing a stream of pressurized air or other fluids at the surfaces of the bore to blow away particles, debris or other residue. As another example, the surface cleaner could be a brush or similar means.

In certain aspects, the apparatus includes a first thermal probe for measuring ambient temperature, a second probe for measuring the workpiece temperature, and a data processor for correcting a bore measurement based on the measured ambient and workpiece temperatures. The processor can be a general purpose computer executing an algorithm for generating a dimension at standard conditions based on the measured dimension and temperatures, or a dedicated processor for performing the algorithm.

In accordance with certain aspects of this disclosure, the apparatus or machine for measuring dimensions of cylindrical bores in a workpiece further includes a means for transmitting inspection data in the form of measurements and/or temperature corrected dimensions to a machine for cutting a cylinder bore or a crank bore into an engine block, or more generally for cutting bores into a workpiece, wherein the machine for cutting the bores includes a processor for controlling a cutting tool to compensate for deviations from desired bore dimensions based on the inspection data.

In accordance with certain aspects of this disclosure, the apparatus or machine for measuring or inspecting bore dimensions in a workpiece includes means for detecting and identifying a type of workpiece characterized by the number, position and dimensions of the bores and/or by the dimensions of the workpiece, and a controller for positioning the gauges for inspection of the bores of the particular type of workpiece identified. An example of a means for identifying a type of workpiece from a variety of different types of workpieces includes an optical imaging device for detecting indicia on the workpiece, a plurality of optical imaging devices for detecting bore number, position or size and/or workpiece dimensions, a camera, radio frequency identification device, photocells or other similar means.

These and other features, advantages and objects of the various embodiments will be better understood with reference to the following specification and claims.

DETAILED DESCRIPTION

Figure 1:
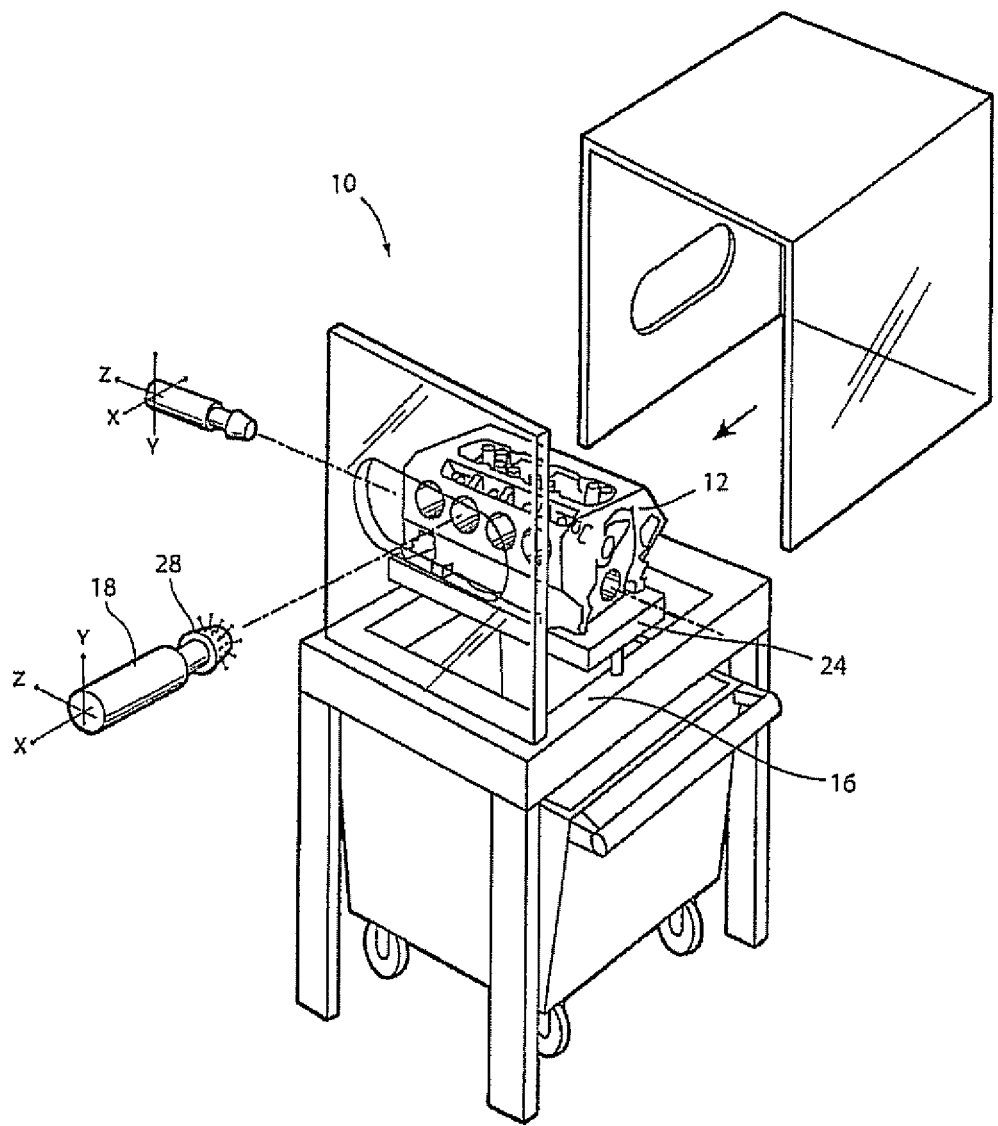
FIG. 1 is a perspective view of an apparatus for gauging bores in a workpiece in accordance with this disclosure.
Figure 2:
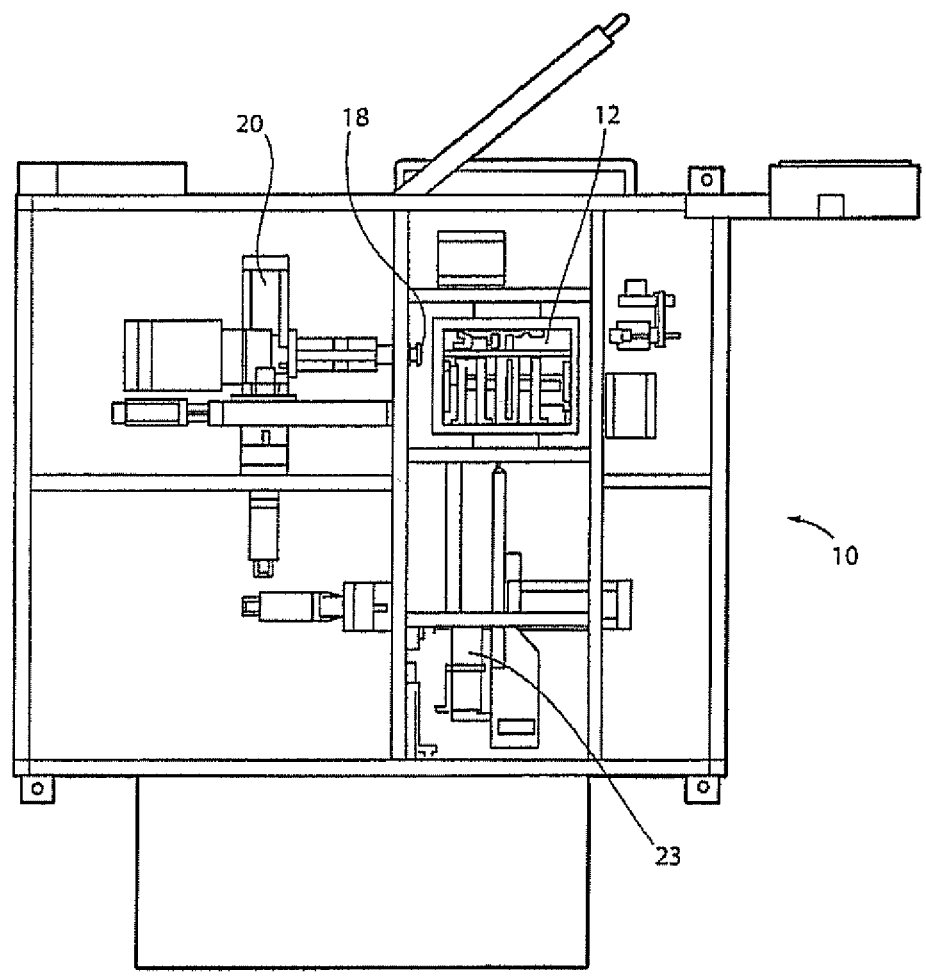
FIG. 2 is a top view of an apparatus for gauging bores in a workpiece, wherein at least one bore is arranged along an axis that is not parallel with an axis along which another bore is arranged.
Figure 3:
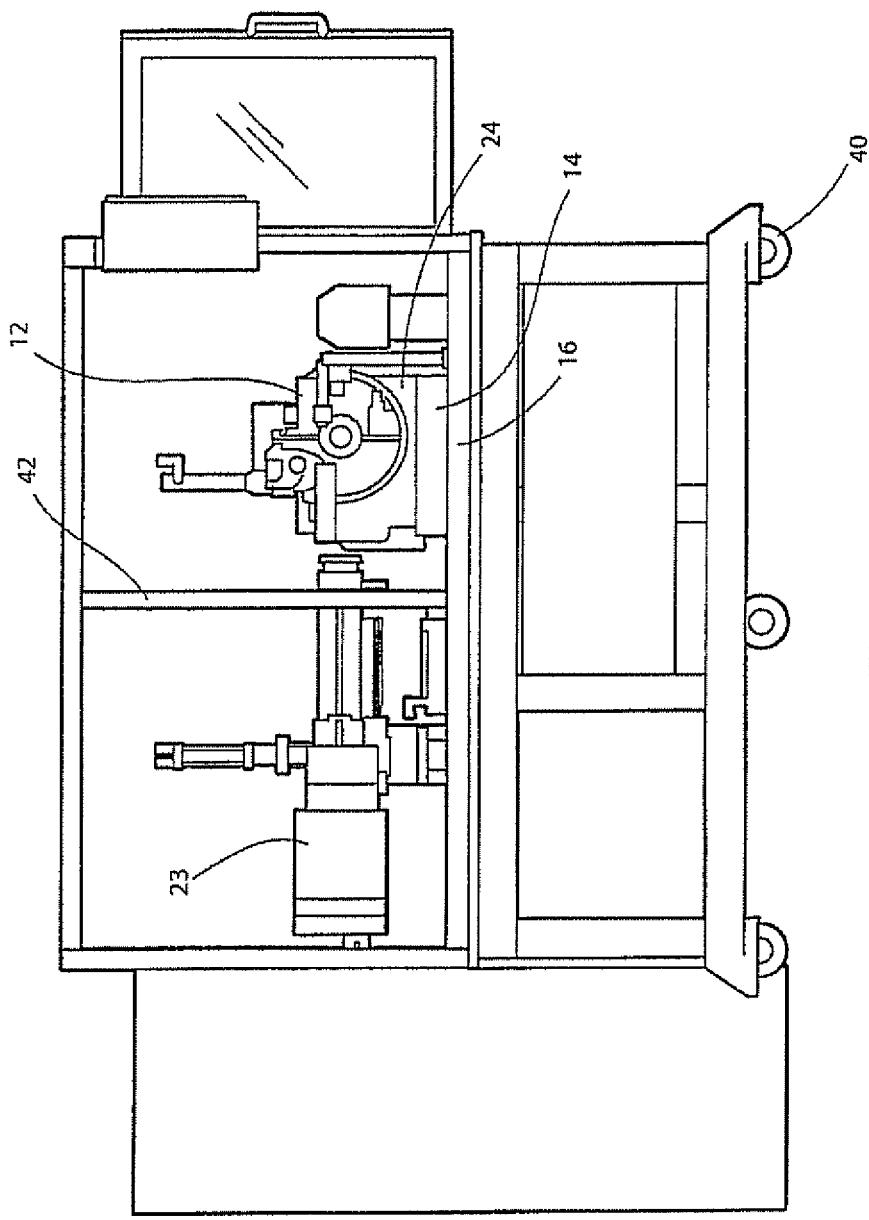
FIG. 3 is a side view of the apparatus shown in FIG. 1.
Figure 4:
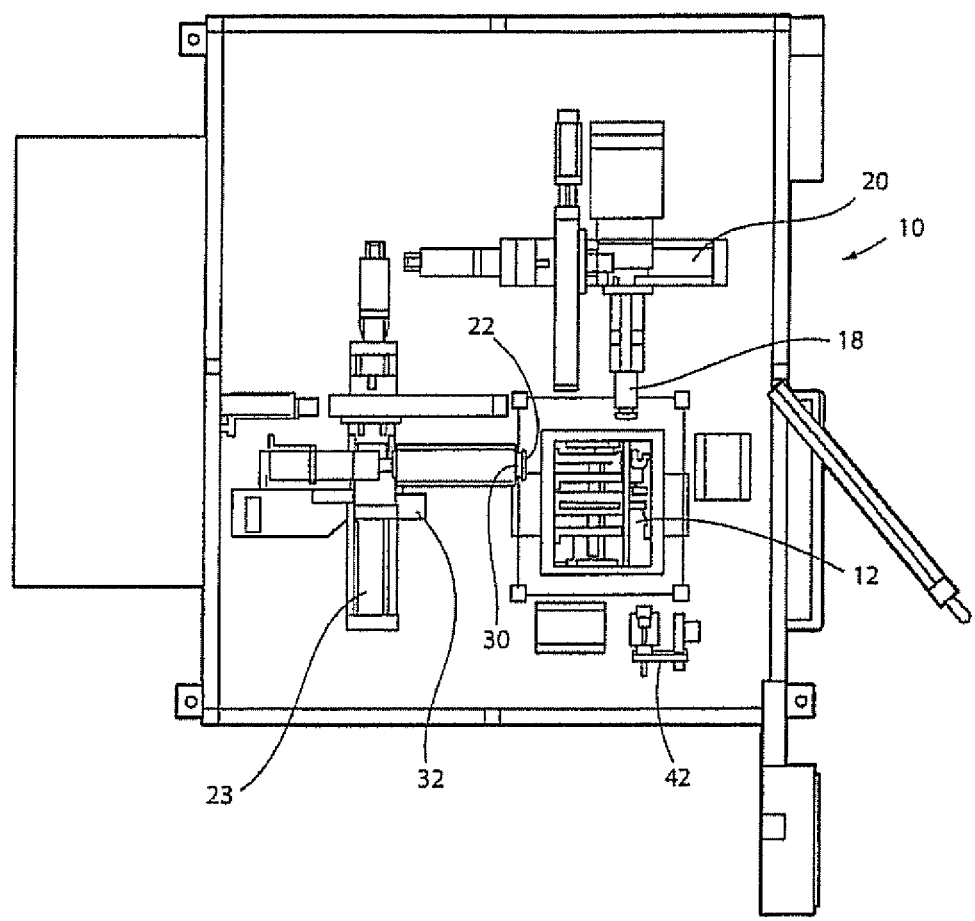
FIG. 4 is an enlarged partial perspective view of the apparatus showing certain details.

Shown in FIGS. 1 and 2 is a fully automated gauging machine or apparatus 10 for checking or measuring the bore dimension of a workpiece 12. Apparatus 10 includes a reference fixture 14 for holding workpiece 12 in a fixed orientation relative to a platform 16 on which the reference fixture 14 is mounted. Bore gauge 18 is aligned along a first axis and is mounted on a first three-dimensional positioning apparatus 20 that is mounted on platform 16. Three-dimensional positioning apparatus 20 allows bore gauge 18 to be reciprocated toward and away from workpiece 12 in a direction aligned parallel with axes of a first set of bores, laterally in a direction perpendicular to the axes of the first set of bores, and upwardly or downwardly. This arrangement allows parallel bores on one side of workpiece 12 to be inspected or measured by gauge 18 without retooling or modifying the apparatus and without having to move workpiece 12 with respect to the apparatus. Bore gauge 22 is aligned along a second axis and is mounted on a second three-dimensional positioning apparatus 23 that allows bore gauge 22 to be positioned to be reciprocated toward and away from one or more bores that are aligned along a second axis that is different from the first axis. In the illustrated embodiment, the bore gauges are aligned to measure bores having axes that are perpendicular. However, the angle between the axes of the two different sets of parallel bores can be generally any value sufficiently greater than zero to facilitate mounting of different bore gauges on different three-dimensional positioning apparatuses. For example, the angle between the axes can be less than 90 degrees such as to facilitate inspection of two sets of cylinder bores in an engine block arranged in a V configuration. As another example, the bores could be on opposite sides of a workpiece such that the bore gauges can be reciprocated along axes that are parallel, but which move the gauges toward the workpiece in opposite directions.

The bore gauges can be contact electronic regular or wide range gauges, air to electronic gauges, optoelectronic gauges, or mechanical gauges, all of which are commercially available, such as from Marposs Corporation, Auburn Hills, Mich. The bore gauges can have capability to check different bore sizes in the range of several millimeters with no retooling of the system.

An adapter plate 24 can be used to allow any of a variety of workpieces, such as workpieces in a series having similar attributes, to be inspected by the apparatus without retooling of the apparatus, accommodating greater flexibility in the inspection process. Such adapter plates could be configured to facilitate mounting of a particular type of workpiece to the particular adapter plate and mounting of the adapter plate to the reference fixture 14.

Disposed on one of the linear drive mechanism of each three-dimensional positioning apparatuses is a bore surface cleaner 28 for removing particles, debris or other residue from the surfaces of the bores prior to inspection or gauging. In the illustrated embodiment, the bore surface cleaner is an air nozzle or air blower that can direct compressed air toward the surfaces of the bores.

A thermal probe 30 can be provided to measure the temperature of the workpiece, and another probe 32 can be provided to measure the ambient temperature. These measurements can be transmitted to a computer or other data processing device, along with measured bore dimensions to calculate a bore dimension at predetermined standard conditions. The measured or calculated bore diameters can be used to correct or adjust a cutting tool to compensate for deviations from desired bore diameters.

This machine is automatically loaded/unloaded with gantry, robot or other kind of automation. It's built for stationary location. The visible wheels 40 are for the disposal of the debris collected into a container as a result of the cleaning process. The reference fixture 14 and the three-dimensional positioning apparatus 20, 23 are desirably all mounted on a single platform 16 that fixes the position of the positioning apparatus 20, 23 relative to the reference fixture. Typically, 100% of workpieces being manufactured are inspected to make sure that the cutting tools are performing correctly and cutting bores of desired size and location within predetermined error limits.

The apparatus 10 may also be provided with an optical imaging device 42 or other means for determining the type of workpiece that is being inspected. The optical imaging device 42 could be used for example to scan a bar code or other optically recognizable code affixed to the workpiece, or could be coupled with a computer or other data processing device executing an algorithm for identifying the particular type of workpiece based on the shape, dimension or other optically discernible characteristics. After the type of workpiece has been determined, which could be done manually by an operator using a keypad or other input device, the same or a different computer or processing device could be used to properly position gauges 18, 22 for inspection of the particular workpiece.

The above description is considered that of the preferred embodiment(s) only. Modifications of these embodiments will occur to those skilled in the art and to those who make or use the illustrated embodiments. Therefore, it is understood that the embodiment(s) described above are merely exemplary and not intended to limit the scope of this disclosure, which is defined by the following claims as interpreted according to the principles of patent law, including the doctrine of equivalents.

The invention claimed is:

1. A gauging machine for checking bore dimensions of a workpiece, comprising:
 a reference fixture onto which a workpiece can be mounted;

a first bore gauge mounted on a first three-dimensional positioning apparatus and arranged to inspect one bore having a first axis or a plurality of bores aligned along a first set of parallel axes; and a second bore gauge mounted on a second three-dimensional positioning apparatus and arranged to inspect one bore having a second axis that is not parallel with the first axis or the first set of parallel axes, or a plurality of bores aligned along a second set of parallel axes which are not parallel with the first axis or first set of parallel axes;

wherein the reference fixture, first three-dimensional positioning apparatus, and second three-dimensional positioning apparatus are arranged to facilitate inspection of the bores of a workpiece that is mounted on the reference fixture; and wherein the reference fixture, first three-dimensional positioning apparatus, and second three-dimensional positioning apparatus are all mounted on a single platform that fixes the position of the first three-dimensional positioning apparatus and second three-dimensional positioning apparatus relative to the reference fixture.

2. The machine of claim 1, in which the one bore aligned along the first axis is cylindrical or the plurality of bores aligned along a first set of parallel axes are cylindrical, and the one bore aligned along the second axis is cylindrical, or the plurality of bores aligned along the second set of parallel axes are cylindrical; and in which the first bore gauge and second bore gauge are cylinder bore gauges.

3. The machine of claim 2, in which the workpiece is an engine block, one of the bores is a crank bore, and one of the first and second cylinder bore gauges is a crank bore gauge.

4. The machine of claim 3, in which the crank bore gauge has range capability to check multiple sizes without adjustment.

5. The machine of claim 1, in which at least one of the bores is a cylindrical bore, and in which at least one of the bore gauges is a cylinder bore gauge.

6. The machine of claim 5, in which the cylinder bore gauge has range capability to check multiple sizes without adjustment.

7. The machine of claim 1, further comprising a single generally planar adapter plate configured to facilitate mounting of a particular type of workpiece selected from a variety of different types of workpieces to the reference fixture.

8. The machine of claim 1, further comprising at least one bore surface cleaner for removing residual millings from the bore surface after the bore has been milled and before the bore is inspected, the bore surface cleaner disposed on a linear drive mechanism of each of the three-dimensional positioning apparatuses.

9. The machine of claim 8, in which the bore surface cleaner is a blower.

10. The machine of claim 8, in which the bore surface cleaner is a brush.

11. The machine of claim 1, in which at least one bore surface cleaner is mounted on each of the first and second three-dimensional positioning apparatuses adjacent the respective first and second bore gauges.

12. The machine of claim 1, further comprising a first thermal probe for measuring ambient temperature, a second thermal probe for measuring workpiece temperature, and a data processor for correcting a bore measurement based on the measured ambient and workpiece temperatures.

13. The machine of claim 1, further comprising a means for transmitting inspection data to a machine for cutting a cylindrical bore into the workpiece, wherein the machine for cutting a cylindrical bore includes a processor for controlling a cutting tool to compensate for deviations from a desired cylindrical bore diameter based on the inspection data.

14. The machine of claim 1, further comprising a means for detecting a type of workpiece mounted on the reference fixture, the type of workpiece characterized by the number, position, and dimensions of the bores, and a controller for positioning the gauges for inspection of the bores.

15. The machine of claim 14 in which the means for detecting a type of workpiece is a camera or a radio frequency identification device.

16. The machine of claim 14, in which the means for detecting the type of workpiece comprises an optical imaging device for detecting indicia on the workpiece or a plurality of optical imaging devices for detecting dimensions of the workpiece or feature locations on the workpiece.

17. The machine of claim 14 in which the means for detecting the type of workpiece comprises photocells.

18. A gauging machine for checking bore dimensions of a workpiece, comprising:
a platform;
a reference fixture mounted on the platform for holding a workpiece in a fixed orientation relative to the platform;
a first three-dimensional positioning apparatus mounted on the platform and holding a first bore gauge for inspecting a first bore in the workpiece having a first axis; and
a second three-dimensional positioning apparatus mounted on the platform and holding a second bore gauge for inspecting a second bore in the workpiece having second axis that are not parallel with the first axis.

* * * * *